United States Patent [19]

Ito et al.

[11] Patent Number: 4,489,688
[45] Date of Patent: Dec. 25, 1984

[54] CONTROL FOR IDLE SPEED CONTROL VALVE

[75] Inventors: Yoshiyasu Ito; Toshio Suematsu; Yuji Takeda; Katsushi Anzai, all of Toyota; Matsuji Yoshida, Ichinomiya, all of Japan

[73] Assignee: Toyota Jidosha Kabushiki Kaisha, Toyota, Japan

[21] Appl. No.: 505,821

[22] Filed: Jun. 20, 1983

[30] Foreign Application Priority Data

Mar. 16, 1983 [JP] Japan ................................. 58-42200

[51] Int. Cl.³ ............................................. F02M 3/00
[52] U.S. Cl. .................................... 123/339; 123/425; 60/611
[58] Field of Search ............... 123/339, 559, 564, 425, 123/435; 60/600, 601, 611

[56] References Cited

U.S. PATENT DOCUMENTS 3,049,865  8/1962  Drayer ................................... 60/611
4,322,948  4/1982  Emmenthal et al. ................. 60/611
4,385,602  5/1983  Itou et al. ............................. 123/339
4,430,973  2/1984  Miyagi .................................. 123/339
4,432,318  2/1984  Kobashi et al. ...................... 123/339

FOREIGN PATENT DOCUMENTS 2095747  10/1982  United Kingdom ................ 123/425

Primary Examiner—Parshotam S. Lall
Attorney, Agent, or Firm—Cushman, Darby & Cushman

[57] ABSTRACT

An idle speed control valve is provided in a bypass path of an intake system and has its opening controlled by control pulse signals. The idle speed control valve is designed to increase the opening in proportion to the increase or decrease of the duty ratio of the control pulse signal and completely close the opening at 0% or 100% of the duty ratio. According to this invention, to completely close the idle speed control valve, instead of sending the control pulse signal of 0% or 100% of duty ratio to the idle speed control valve, the transmission of the control pulse signal is interrupted or the idle speed control valve is driven by continuous direct current.

6 Claims, 6 Drawing Figures

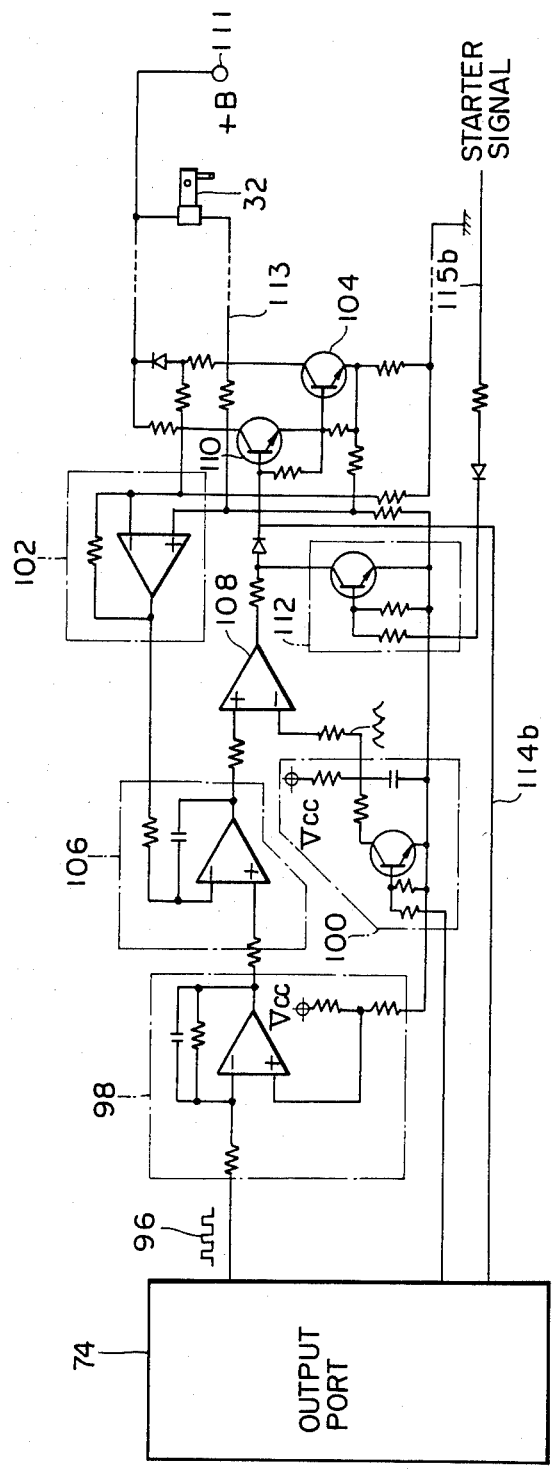
F I G. 5

CONTROL FOR IDLE SPEED CONTROL VALVE

BACKGROUND OF THE INVENTION

1. Field of the Invention

This invention relates to a control for an idle speed control valve which controls bypass flow of intake air in a period of idling.

2. Description of the Prior Art

In an idle speed control is provided a bypass path parallel to an intake path portion provided with a throttle valve. An idle speed control valve (hereinafter called "ISC valve") is provided in the bypass path and the opening of the ISC valve is controlled by control pulse signals. Assuming that 0% or 100% of the duty ratio of the control pulse signal is designed to fully close the ISC valve, conventional control system for an ISC valve sent the control signal having a duty ratio of 0% or 100% to the ISC valve when the ISC valve was to be fully closed. In actual control circuits, however, absolute 0% or 100% of duty ratio is not attained and pulses or gaps (low level voltage portion between adjacent pulses) with fine width took place and, as noise, rode on the signal line of a knock sensor there resulted adverse effects on the knock control of the ignition timing or supercharging performance was degraded in the supercharging period without completely closing the ISC valve.

SUMMARY OF THE INVENTION

An object of the present invention is to provide a control for an ISC valve which can prevent control pulse signals of the ISC valve from causing noises and which can completely close ISC valve.

To achieve this object, according to the present invention, the control for an ISC valve interrupts the transmission of the control pulse signals to the ISC valve or sends continuous direct current to the ISC valve when the ISC valve is to be fully closed.

As a result, energizing current flowing to the ISC valve is brought completely to nil, or sufficient continuous energizing current flows to the ISC valve so that the ISC valve is completely closed. Also no pulses or gaps with fine width take place, and noises are prevented from riding on the signal line of the knock sensor.

The ISC valve is fully closed, for example, in a supercharging period or a period when ignition timing is controlled in relation to knocking.

The above-mentioned and other objects and features of the invention will become apparent from the following detailed description taken in conjunction with the drawings which indicate an embodiment of the invention.

BRIEF DESCRIPTION OF THE INVENTION

FIG. 5 is a detailed circuit diagram of another drive circuit for the ISC valve.

DETAILED DESCRIPTION OF PREFERRED EMBODIMENT

Figure 1:
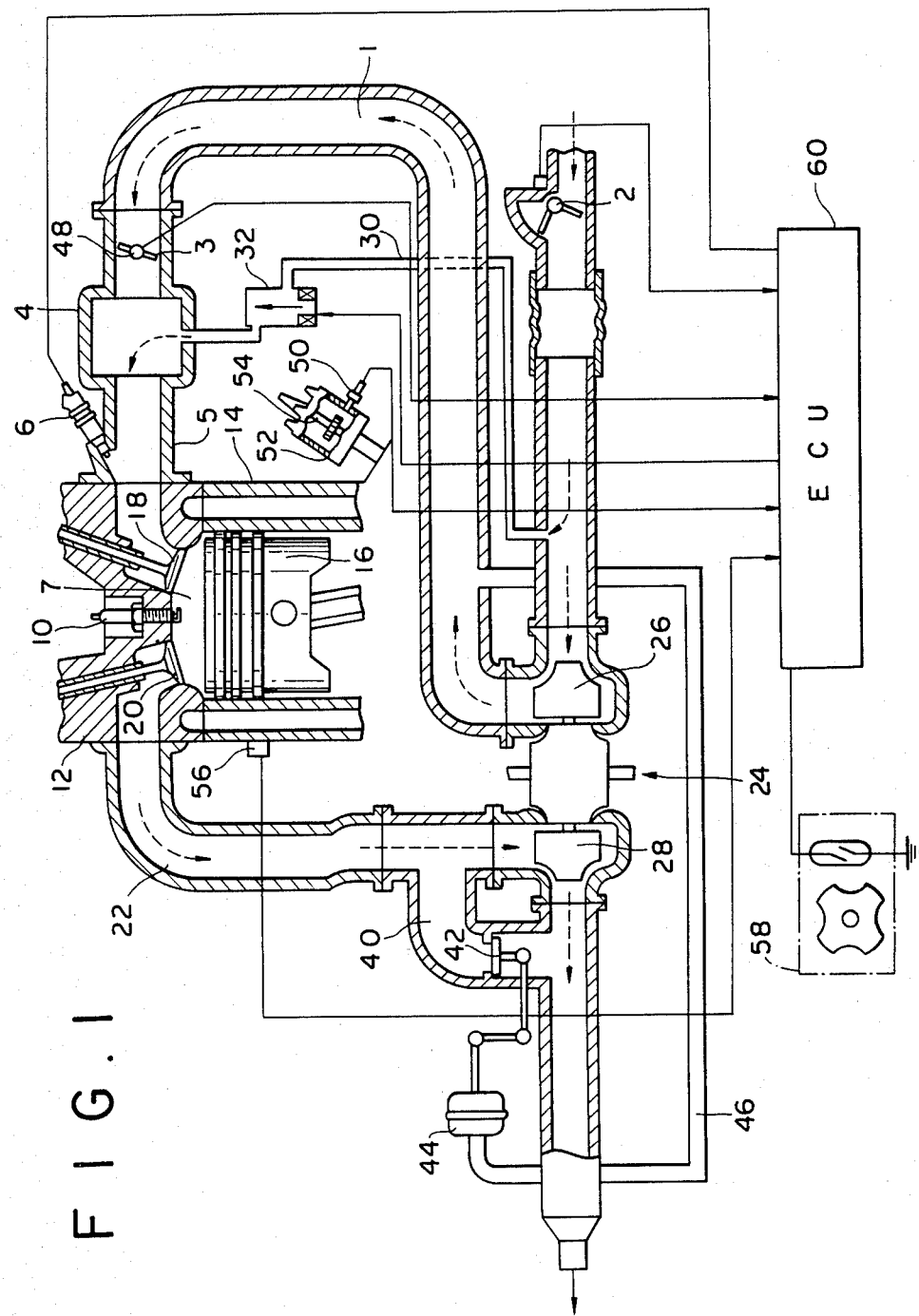
FIG. 1 is a diagramatic representation of the whole engine of an internal combustion engine to which the present invention applies.

In FIG. 1, there is provided sequentially an air flow meter 2, an intake path 1 a throttle valve 3, a surge tank 4 and intake pipe 5. A fuel injector 6 is provided in each intake pipe 5 to inject fuel toward a combustion chamber 7. The combustion chamber 7 has an ignition plug 10 and is defined by a cylinder head 12, a cylinder block 14 and a piston 16. Mixture enters the combustion chamber 7 through an intake valve 18 and, after combustion, is exhausted to an exhaust path 22 through an exhaust valve 20. A supercharger 24 comprises a compressor 26 provided in the intake path 1 and a turbine 28 provided in the exhaust path 22, both compressor 26 and turbine 28 being secured fixedly to a common shaft. An intake bypass path 30 connects the intake path portion upstream of the compressor 26 to the surge tank 4 and an ISC valve 32 controls the sectional area of flow in the intake bypass path 30. An exhaust bypass path 40 is provided parallel to the exhaust path portion provided with the turbine 28 so that the sectional area of flow in said path 40 is controlled by a control valve 42. A pneumatic actuator 44 controls the opening of the control valve 42 in relation to supercharged pressure sent through a path 46. When the supercharged pressure is raised, the opening of the control valve 42 is increased to increase the escaping amount of exhaust gas, and thus the rotational speed of the turbine 28 is reduced to lower the supercharged pressure. A throttle position sensor 48 detects the opening of the throttle valve 3, a rotational angle sensor 50 detects crank angle from the rotation of a shaft 54 of a distributor 52, a knock sensor 56 mounted on the cylinder block 14 detects knocking and a vehicle speed sensor 58 detects vehicle speed from the rotation of an output shaft of a transmission. ECU (Electronic Control Unit) 60 receives the input from each sensor to control the fuel injector 6 and ISC valve 32.

Figure 2:
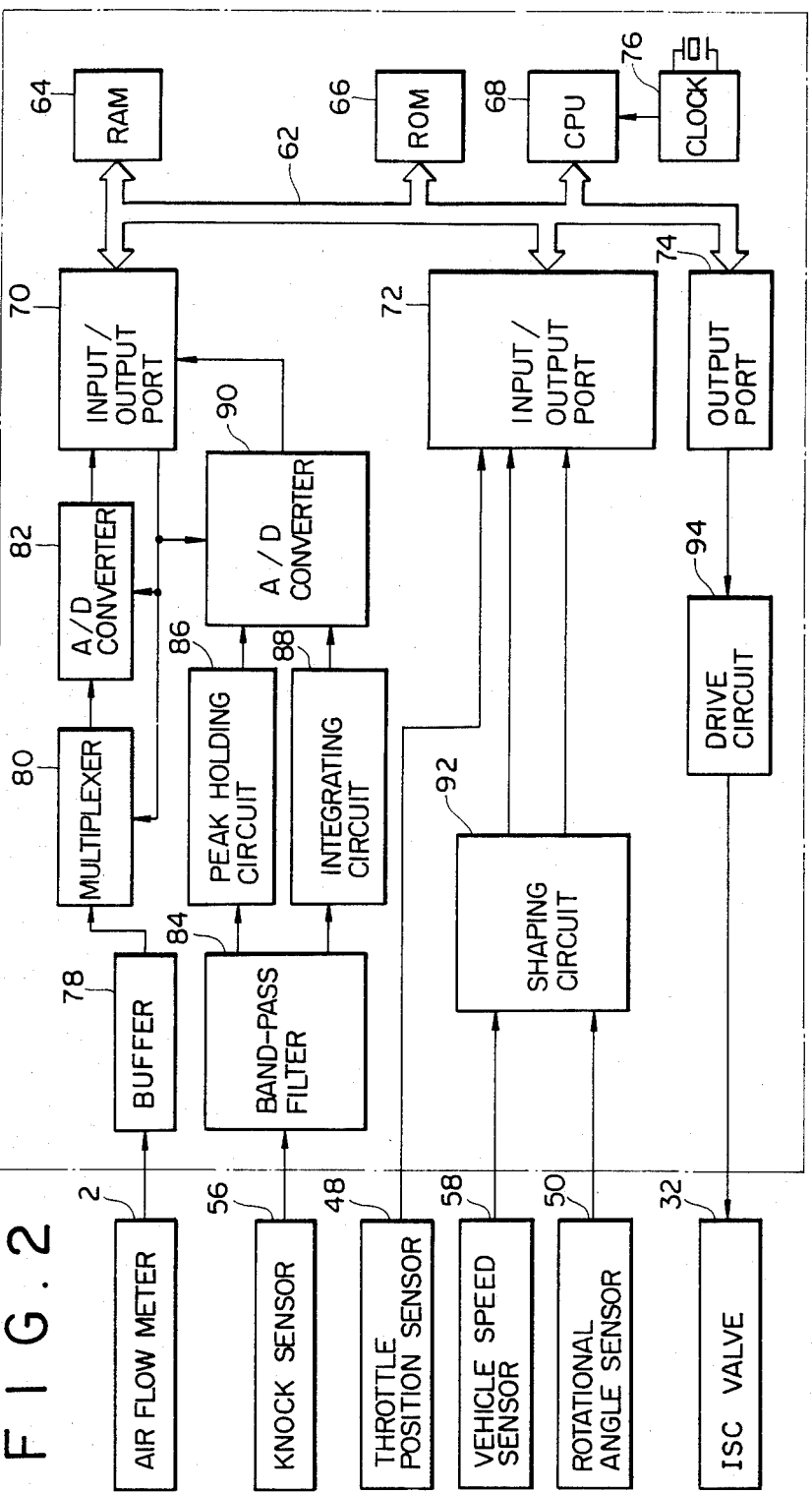
FIG. 2 is a block diagram of ECU (Electronic Control Unit) or FIG. 1.

In FIG. 2, ECU 60 comprises RAM 64, CPU 68, input/output ports 70, 72 and output port 74 interconnected by a bus 62. CPU 68 receives clock pulses from CLOCK 76. The analog output from the air flow meter 2 is sent to a multiplexer 80 through a buffer 78. The multiplexer 80 selects and sends the input point to an A/D converter 82 which A/D converts and sends data to the input/output port 70. The output of the knock sensor 56 is sent to a peak holding circuit 86 and an integrating circuit 88 through a band-pass filter 84. The outputs of the peak holding circuit 86 and integrating circuit 88 are A/D converted by an A/D converter 90 and then sent to the input/output port 70. When any knocking takes place, the output of the peak holding circuit 86 becomes larger than the output of the integrating circuit 88, i.e. a predetermined times the average value of the output of the knock sensor 56. Pulses of the vehicle speed sensor 58 and rotational angle sensor 50 are sent to the input/output port 72 through a shaping circuit 92. ISC valve 32 receives control pulse signals from the output port 74 through a drive circuit 94.

Figure 3:
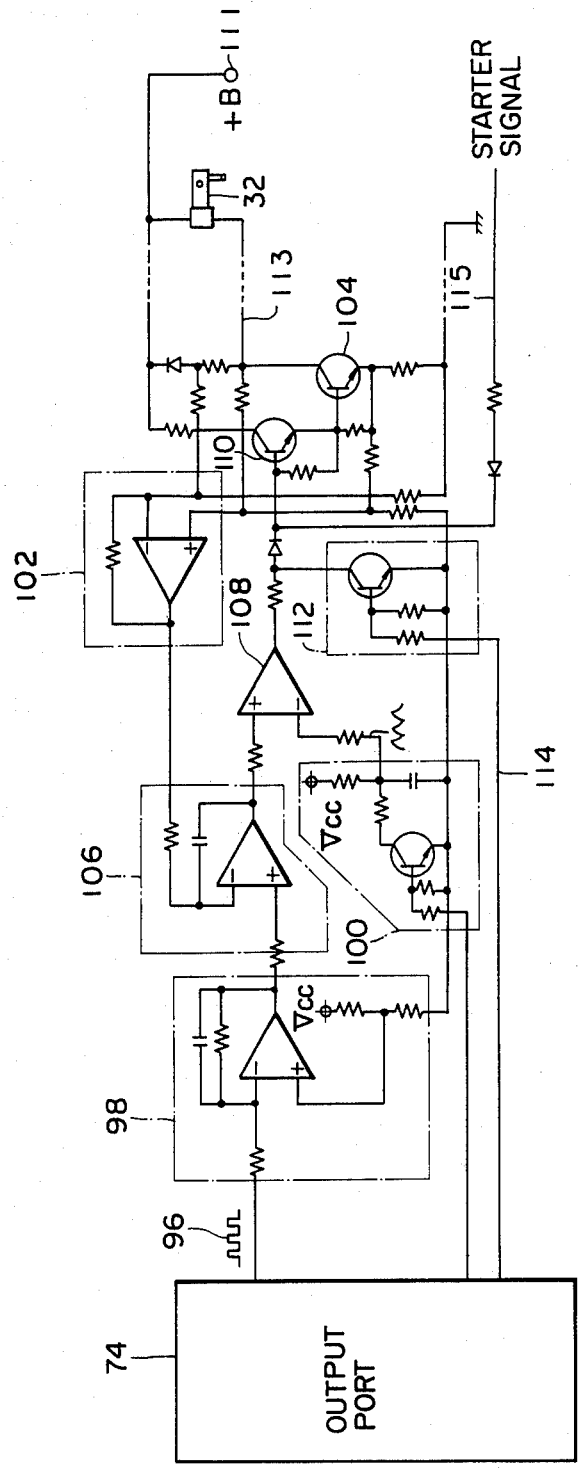
FIG. 3 is a detailed circuit diagram of a drive circuit for an ISC valve.

FIG. 3 shows details of the drive circuit 94 of FIG. 2. Pulse signals 96 for the ISC valve are sent to F-V (Frequency-Voltage) converting circuit 98, and a triangular wave generating circuit 100 receives control pulse signals of 250 Hz from the output port 74 to generate a 250 Hz triangular wave. A current detecting circuit 102 detects energizing current for ISC valve 32 from the emitter voltage of a power amplifier 104 to send direct current voltage proportional to the energizing current to a deviation amplifying circuit 106. The deviation amplifying circuit 106 compares the output voltage of the current detecting circuit 102 with that of F-V converter 98 to increase the output voltage in proportion to the increase of the deviation, namely, as the energizing current for ISC valve 32 is reduced relative to a calculated value of CPU 68. A comparator 108 compares the output voltage of the deviation amplifying circuit 106 with that of the triangular wave generating circuit 100 to generate high level voltage only in a period when the former is higher than the latter. The output pulse signal of the comparator 108 is sent to the base of a switching transistor 110 in the power amplifier 104. ISC valve 32 is at one end connected to a voltage terminal 111 of +B and at the other end to the power amplifier 104 through a line 113. The output terminal of an ISC valve current cutting circuit 112 is connected between the output terminal of the comparator 108 and the base of the switching transistor 110. The ISC valve current cutting circuit 112 maintains the switching transistor 110 turned off in a period when high level voltage is sent from the output port 74 through an ISC valve fully-closing signal line 114. The base of the switching transistor 110 is supplied with starter signals through a starter signal line 115 and ISC valve 32 is fully closed in a period of operation of the starter. Further, ISC valve 32 is designed to increase the opening in proportion to the increase of the energizing current.

Figure 4:
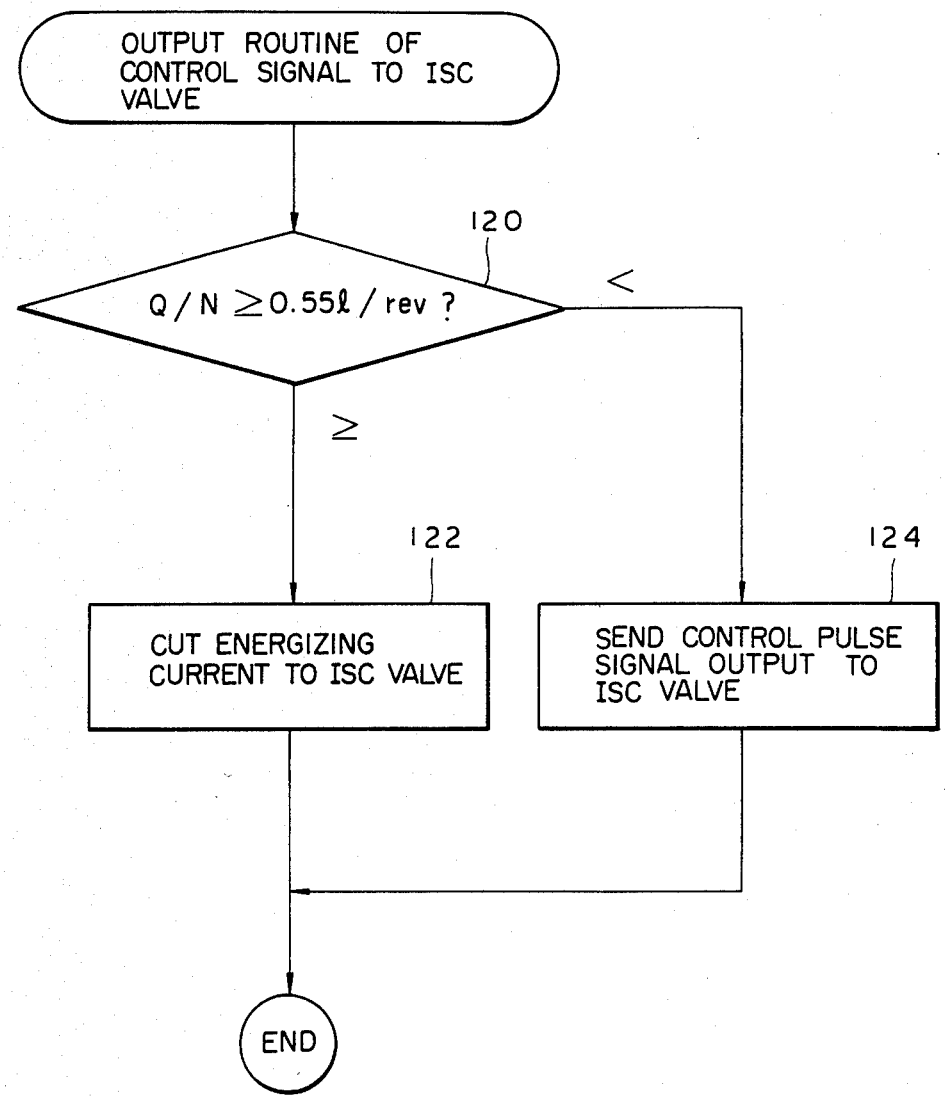
FIG. 4 is a flow chart of the output routine of the control signal to the ISC valve.

FIG. 4 is a flow chart of an output routine of control signals to ISC valve 32. In step 120 is judged whether or not Q/N≧0.55l/rev and advance is made to step 122 if it is judged yes and to step 124 if it is judged no, provided Q is the intake air amount and N is the number of revolutions of the engine. Delay angle control of ignition timing accompanying the occurrence of knocking is carried out only in the high load region of Q/N≧0.55l/rev, and since Q/N≧0.7l/rev in the supercharging period, step 122 is executed according to the judgement in step 120 in the delay angle controlling period of ignition timing and supercharging period. Step 124 is performed in a period other than either of said periods. In step 122, high level voltage is sent from the output port 24 to the ISC valve current cutting circuit 112. As a result, the power amplifier 104 is turned off to bring energizing current in a line 113 completely to nil. Consequently, ISC valve 32 is completely closed and any noises do not ride on lines near the line 113. In step 124, the power amplifier 104 is turned on or off according to the calculated value of the duty ratio and thereby pulse current is sent to ISC valve 32 so that energizing current proportional to the duty ratio of the control pulse signal flows to the ISC valve.

FIG. 5 is a detailed circuit diagram of another driving circuit 94 for the ISC valve. Describing only portions differing from those of FIG. 3, an ISC valve fully-closing signal line 114b is connected to the base of the switching transistor 110, and a starter signal line 115b is connected to the base of the ISC valve current cutting circuit 112. ISC valve 32 in FIG. 5 is designed to reduce the opening as the energizing current is increased. The switching transistor 110 is maintained at the turnedon condition while high level voltage is sent from the output port 74 through the ISC valve fully-closing signal line 114b to the base of the switching transistor 110, and continuous direct current is supplied to ISC valve 32 through the line 113 to fully close ISC valve 32.

Figure 6:
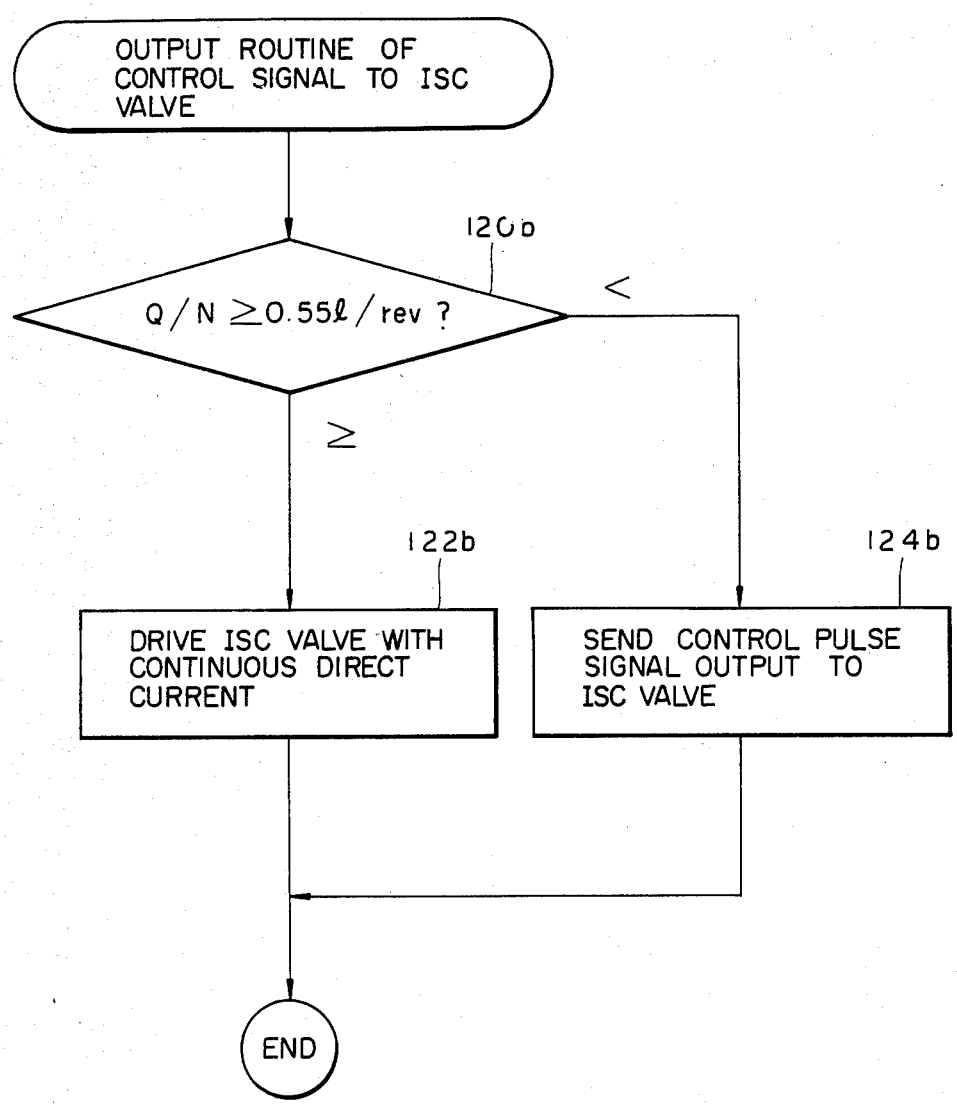
FIG. 6 is a flow chart of the output routine of the control signal to the ISC valve.

FIG. 6 is a flow chart of another routine of control signals to ISC valve 32. In step 120b it is judged whether or not Q/N≧0.55l/rev and advance is made to step 122b if it is judged yes and to step 124b if it is judged no. Delay angle control of ignition timing accompanying the occurrence of knocking is carried out only in the high load region of Q/N≧0.55l/rev. Since Q/N≧0.7l/rev in the supercharging period, step 122b is executed in the delay angle control period of ignition timing and supercharging period according to the judgement in step 120b and step 124b is executed in a period other than either of said periods. In step 122b, high level voltage is sent to the base of the switching transistor 110 through the ISC valve fully-closing signal line 114b. Thus, the power amplifier 104 is maintained continuously at the turned-off condition to supply sufficient continuous energizing current to ISC valve 32. As a result, ISC valve 32 is completely closed, and noises do not ride on lines near the line 113. In step 124b, the power amplifier 104 is turned on or off according to the calculated value of the duty ratio and thereby pulse signals are sent to ISC valve 32 to which flows energizing current proportional to the duty ratio of the control pulse signal.

What is claimed is:

1. A control device for an idle speed control valve for use on an engine in which a bypass path is provided parallel to an intake path portion provided with a throttle valve and the idle speed control valve is provided in the bypass path, the opening of the idle speed control valve being controlled by a control pulse signal wherein when said control pulse signal has a 0% duty ratio the idle speed control valve is caused to be fully-closed, said control device comprising:

interrupting means for interrupting the transmission of said control pulse signal to the idle speed control valve, wherein said idle speed control valve is a solenoid valve and the opening of the solenoid valve is a continuous function of input current, the input current being in the form of said control pulse signal whose duty ratio is controlled; and a complete closure indicating means for operating said interrupting means in order that the idle speed control valve may be fully closed.

2. A control device as defined in claim 1, wherein said interrupting means is a means for maintaining continuously a power amplifier connected in series to the idle speed control valve under the turned-off condition.

3. A control device as defined in any one of claims 1 or 2, wherein said full-closure indicating means operates the interrupting means in the supercharging period and/or in the period of ignition timing controlled on the basis of the input from the knock sensor.

4. A control device for an idle speed control valve for use on an engine in which a bypass path is provided parallel to an intake path portion provided with a throttle valve and said idle speed control valve is provided in the bypass path, the opening of the idle speed control valve being controlled by a control pulse signal wherein when said control pulse signal has a 100% duty ratio the idle speed control is caused to be fully closed, said control device comprising:

a drive means for driving the idle speed control valve with continuous direct current, wherein said idle speed control valve is a solenoid valve and the opening of the solenoid valve is a continuous function of input current, the input current being in the form of said control pulse signal whose duty ratio is controlled; and a full closure indicating means for sending operating signals to the drive means in order that the idle speed control valve may be fully closed.

5. A control device as defined in claim 4, wherein said drive means maintains continuously a power amplifier connected in series to the idle speed control valve under the turned-on condition.

6. A control device as defined in any one of claims 4 or 5, wherein said full closure indicating means sends operating signals to the drive means in the supercharging period and/or in a period when the ignition timing is controlled on the basis of the input from the knock sensor.

* * * * *